United States Patent

Suman et al.

[11] Patent Number: 5,377,948
[45] Date of Patent: Jan. 3, 1995

[54] BREAKAWAY REARVIEW MIRROR MOUNTING BRACKET

[75] Inventors: Danny L. Suman, West Olive; Wayne J. Rumsey; Paul C. De Kleine, both of Holland, all of Mich.

[73] Assignee: Gentex Corporation, Zeeland, Mich.

[21] Appl. No.: 20,881

[22] Filed: Feb. 19, 1993

Related U.S. Application Data

[63] Continuation of Ser. No. 840,870, Feb. 25, 1992, abandoned, which is a continuation-in-part of Ser. No. 703,381, May 21, 1991, abandoned.

[51] Int. Cl.⁶ .................................................. B60R 1/00
[52] U.S. Cl. ..................................... 248/549; 248/900
[58] Field of Search ............... 248/549, 548, 900, 483, 248/224.1, 224.2, 222.1; 359/872, 876, 871

[56] References Cited

U.S. PATENT DOCUMENTS

| | | | |
|---|---|---|---|
| 3,131,251 | 4/1964 | Ryan | 248/224.1 X |
| 3,367,616 | 2/1968 | Bausch et al. | 248/483 |
| 4,254,931 | 3/1981 | Aikens et al. | 248/900 X |
| 4,632,348 | 12/1986 | Keesling et al. | 248/222.1 |
| 4,936,533 | 6/1990 | Adams et al. | 248/483 X |
| 4,948,085 | 8/1990 | Mittelhäuser | 248/549 |
| 5,058,851 | 10/1991 | Lawlor et al. | 248/549 |
| 5,100,095 | 3/1992 | Haan et al. | 248/549 |

FOREIGN PATENT DOCUMENTS 2046687 11/1980 United Kingdom ................. 248/900

*Primary Examiner*—Karen J. Chotkowski
*Attorney, Agent, or Firm*—Flynn, Thiel, Boutell & Tanis

[57] ABSTRACT

A breakaway bracket is provided for mounting a rearview mirror to a button on the inner surface of a vehicle windshield. The bracket includes a spring clip which has a base portion, longitudinally extending, opposed, resilient side flanges, and a resilient locking flange which extends from the base portion. The side flanges have grooves and the locking flange has tabs so that when the bracket is mounted to the button, the grooves receive side surfaces of the button in tongue-and-groove fashion, and the tabs firmly engage a bottom surface of the button.

40 Claims, 9 Drawing Sheets

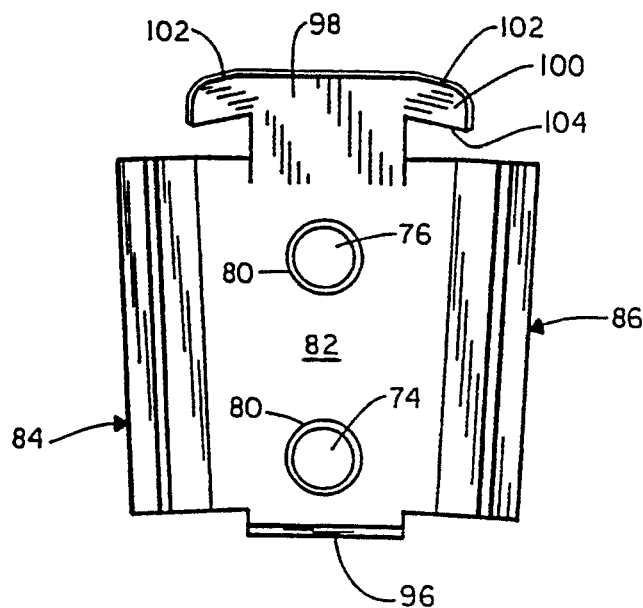
FIG. 5
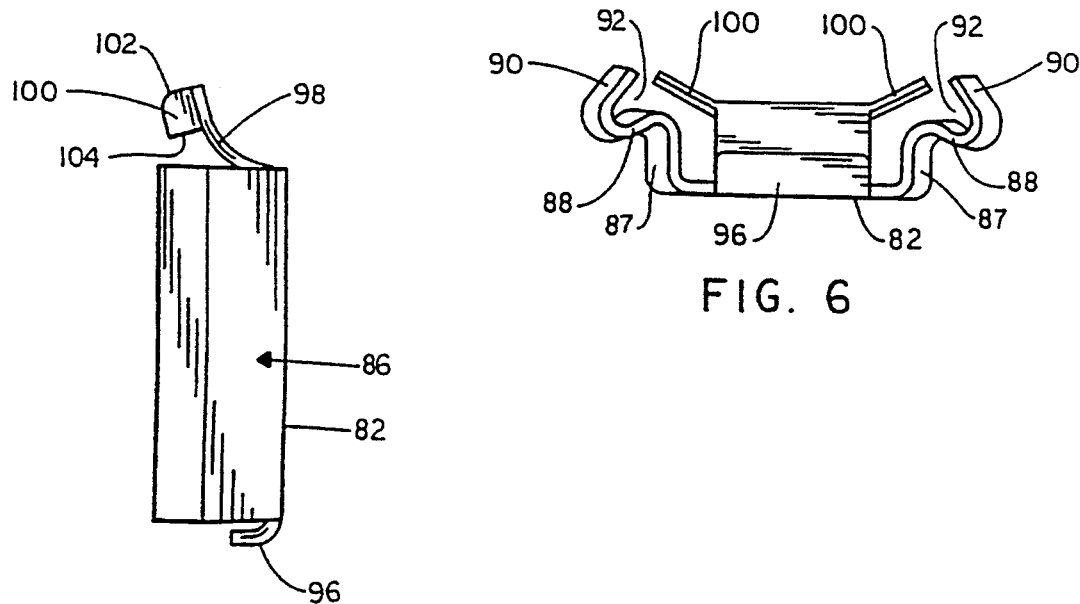
FIG. 6
FIG. 7

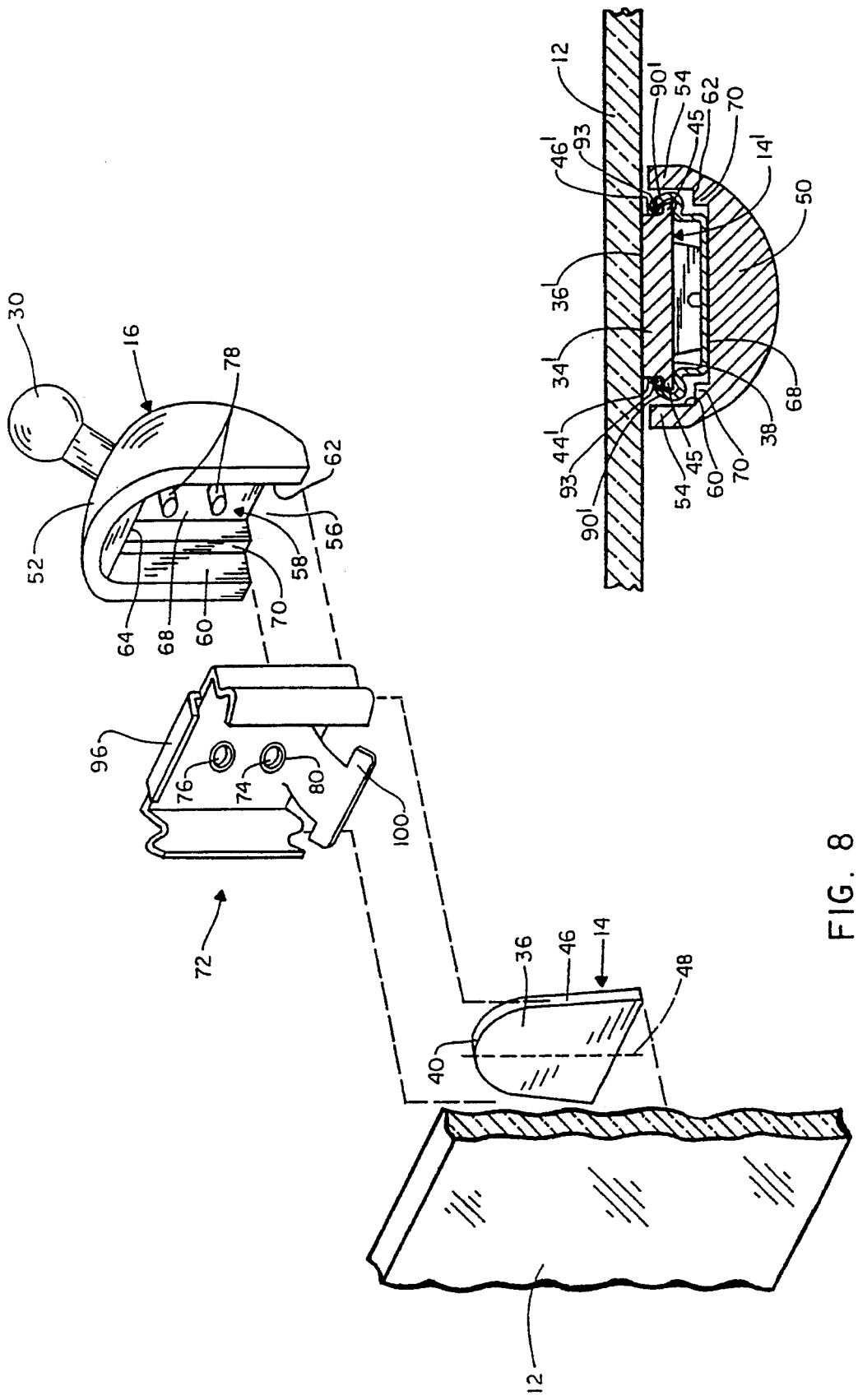

BREAKAWAY REARVIEW MIRROR MOUNTING BRACKET

This is a continuation-in-part of Ser. No. 07/840,870, filed Feb. 25, 1992, now abandoned which is a continuation-in-part of Ser. No. 07/703,381, filed May 21, 1991, now abandoned.

BACKGROUND OF THE INVENTION

1. Field of the Invention

This invention relates to interior rearview mirror assemblies mounted to a button on the interior of a vehicle windshield.

2. Scope of the Prior Art

Interior windshield-mounted rearview mirrors are commonly used in nearly all vehicles manufactured and sold throughout the world. Different mounts have been designed for different vehicles and are subjected to varying regulations of the different countries in which automobiles and similar vehicles are manufactured.

In the United States and Canada, for example, supports for conventional windshield-mounted rearview mirrors typically include a base member, known commonly as a "button", adhered to the inside of the windshield surface. The button has vertically disposed edges forming rails. The rails may be formed by a bevel on a each edge. A support member, known in the industry as a "channel mount" is slidably fitted over the button whereby sides of the channel mount engage the rails of the button. The channel mount usually includes a mounting means such as an arm, ball joint, or other structure for suspending a rearview mirror in the vehicle compartment for use by the driver of the vehicle. A typical mounting assembly in U.S. vehicles includes a linkage with a double ball joint for adjusting the mirror relative to the windshield in a variety of positions.

Typically, the channel mount is retained on the button by the use of a set screw. However, the use of such a set screw has created numerous manufacturing and maintenance problems in the vehicle assembly. For example, set screws are typically purchased as low-priced commodity items with low tolerances in the screw threads. The inconsistency in such threads can result in cross threading of the screw in its aperture. Sometimes, automatic screwdrivers stop prematurely at a preset stall torque even though the support is not firmly tightened against the button. Sometimes the screws fit so sloppily that there is no torque. Also, the set screw is often stripped out by over-tightening because of the improper sizing of the socket to the set screw or a weakness in the threads of the screw itself.

Attempts have been made in the past to design interior mirror mounts without the use of a set screw. An example may be found in U.S. Pat. No. 4,936,533 issued to Adams et al. on Jun. 26, 1990. This patent discloses a vehicle accessory mounting assembly comprising a spring retainer on the channel mount which is adapted to engage and grip an opposing, raised rib on the surface of the button. The Adams et al. design, however, presents some problems in that it requires a specially designed button and it is virtually impossible to disassemble without utilizing a special tool.

Various governmental agencies have imposed certain standards, test procedures, test conditions, records and recording formats on the manufacture of internal rearview mirror assemblies. The current federal safety standard in the United States is applicable to passenger cars, multipurpose passenger vehicles, trucks, and buses. The stated purpose of the standard is to reduce the number of deaths and injuries that occur when the driver of a motor vehicle does not have a clear and reasonably unobstructed view to the rear. It requires that each passenger car have an inside rearview mirror of unit magnification and that the mirror provide a specified view. The mirror mounting is required to provide a stable support for the mirror. Mirror adjustment by tilting in both horizontal and vertical directions must be provided. Further, if the mirror assembly is located in the head impact area, the mounting is required to deflect, collapse, or break away without leaving sharp edges when the reflective surface of the mirror is subjected to a force of 90 pounds in any forward direction which is not more than 45° from the forward longitudinal direction of the vehicle.

The breakaway feature becomes particularly important when one considers the increasing use of passenger-side air bags. When a passenger-side air bag is inflated, it may impact the windshield-mounted rearview mirror, and can cause the mirror to deflect with a force sufficient enough to break the mirror mount or crack the windshield. In either case, sharp edges resulting from the fractures may be sufficient to prematurely deflate the air bag, thus rendering it ineffective. Proposed future standards may require a windshield-mounted mirror to break away from the mounting without leaving sharp edges at a force substantially less than 90 pounds.

The U.S. Patent to Aikens et al., 4,254,931, (issued Mar. 10, 1981) discloses an interior rearview mirror mount wherein a spring clip on a mounting member slides over a button on a windshield to provide a breakaway mount. The button has a plurality of serrations in an inner face thereof. The spring clip has a lock spring which engages the serrations to prevent easy sliding of the mounting member from the button. The Aikens et al. mount requires a special button which differs from buttons now in use. Further, the plurality of serrations may give a false impression as to whether the mount is fully seated on the button.

The European Economic Community (EEC) currently has motor vehicle regulations which require that a rearview mirror assembly be able to withstand a predetermined static load including the support of a weight without breaking or, if the assembly does break, without glass fragments being released. Consequently, breakaway mirror mounts have been used in Europe for a long time. Most European mirror mounts include a single ball-joint connection with the rearview mirror. An example of such a rearview mirror mount is manufactured by Hohe KG and comprises a specially designed button which is adapted to receive a complementary-shaped channel mount with a spring retainer. Rather than being slidably mounted on the button, however, the channel mount is positioned over the button and then rotated anywhere from 60° to 90° to lock the mount to the windshield button. The button has a detent which is adapted to receive a tab on the channel mount when the channel mount is rotated to the locked position. It has been found that this awkward movement increases the time for installation during assembly of the vehicle.

One of the difficulties encountered with various breakaway designs for interior rearview mirror mounts is in minimizing vibration of the mirror during vehicle travel. Unless the mirror mount is tightly held to the button on the windshield, the mirror will be subjected to vibration which blurs images in the mirror. Thus, mirror mounts must be sufficiently rigid to withstand normal loads imposed during use. In addition, mounts must maintain proper operating characteristics throughout the full range of temperatures which might be experienced.

A need exists for an interior rearview mirror mount which is capable of retaining a mirror element in a stable position, is configured to be usable in the majority of vehicles which have varying windshield areas, angles of inclination, and radii of curvature, which will readily break away from the button when subjected to an impact of predetermined magnitude, which is nevertheless readily removable for replacement, and which is aesthetically pleasing and capable of high-volume production at reduced manufacturing cost from that heretofore experienced.

SUMMARY OF THE INVENTION

The present invention provides a breakaway bracket adapted for mounting a rearview mirror to a button secured to an inner surface of a vehicle windshield. The button typically has opposed side surfaces tapering toward the windshield and a bottom surface. The bracket comprises a body having a mounting surface, and a spring clip. The spring clip is securely mounted to the mounting surface, and includes a base portion, longitudinally extending, opposed, resilient side flanges projecting upwardly from the base portion and a resilient locking flange projecting upwardly from the base portion. Each of the resilient side flanges defines a groove which is adapted to slidably receive a corresponding button side surface in a tongue-and-groove fashion. A portion of the locking flange is adapted to firmly engage the bottom surface of the button when the bracket is mounted to the button so that the bracket will be securely retained on the button under ordinary conditions when the button is slidably received in the spring clip. But, it is also adapted to be snapped off the button in a direction away from the windshield when a force of predetermined magnitude is applied.

In another aspect of the invention, the button has a top surface opposite the bottom surface. The bracket includes a stop member which engages the top surface when the bracket is mounted to the button. The stop member can be located on the body or, alternatively, it can project from the spring clip.

In one embodiment of the invention, the button has a locking flange edge, and the spring clip has a resilient locking flange with a portion thereof adapted to snap over the locking flange edge to generate a single tactile indicia, for example, a sonic vibration, and/or a single audible click when the bracket is fully seated on the button. Typically, the locking flange edge is the bottom edge of the button, but the locking flange edge can also be formed by an indentation in the outer or bracket facing surface of the button.

BRIEF DESCRIPTION OF THE DRAWINGS

The invention will now be described with reference to the following drawings, in which:

FIG. 5 is a plan view of the spring clip shown in FIG. 4;

FIG. 6 is an end view of the spring clip shown in FIGS. 4 and 5;

FIG. 7 is a side view of the spring clip shown in FIGS. 4 through 6;

FIG. 8 is an exploded view of the mirror and mounting assembly shown in FIG. 1;

FIG. 9 is a cross-sectional view, like FIG. 3, of a second embodiment of the invention.

DESCRIPTION OF THE PREFERRED EMBODIMENT

Figure 1:
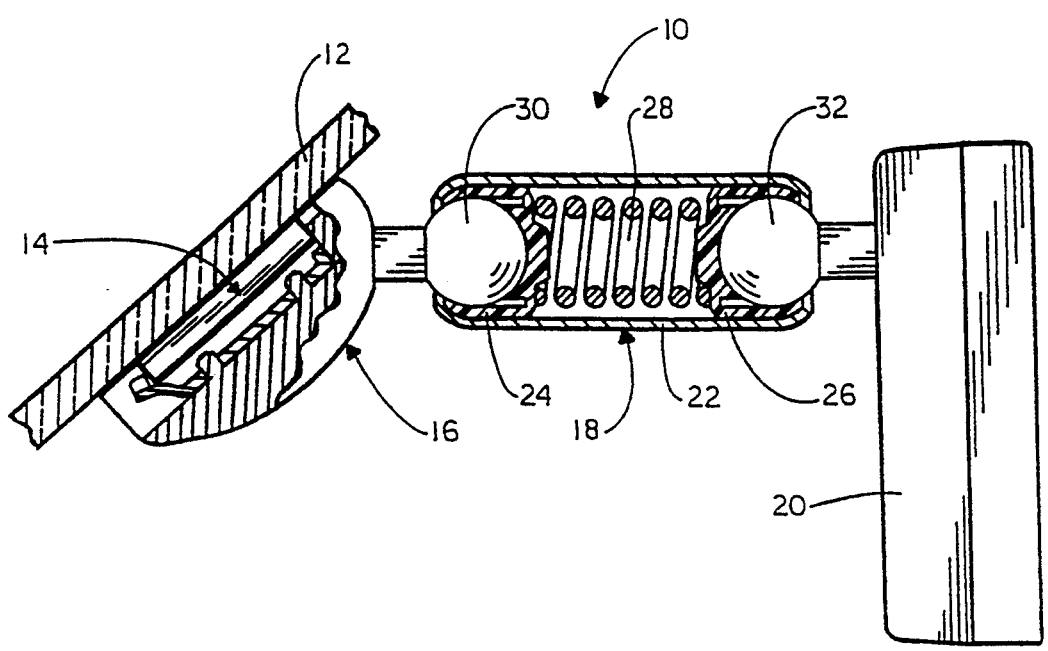
FIG. 1 is a side elevation partially broken away of a rearview mirror assembly as mounted to a windshield utilizing the bracket of the present invention.

Certain terminology will be used in the following description for convenience in reference only and will not be limiting. The words "up" and "down", "right" and "left" will designate directions in the drawings to which reference is made. The words "in" and "out" will refer to directions toward and away from, respectively, the geometric center of the device and designated parts thereof. Such terminology will include derivatives and words of similar import.

Referring now to the drawings in greater detail, FIG. 1 illustrates a rearview mirror assembly 10 as mounted to the inside surface of a conventional automotive windshield 12. The windshield 12 is shown at a conventional slant to the horizontal, and it will be understood that the mirror assembly 10 is generally mounted on the inner surface thereof usually in about the transverse center of the windshield and forwardly of the occupants of the front seat. A base member 14, commonly known in the industry as a "button" is permanently adhered to the inner surface of the windshield 12 by means of a conventionally-known metal-to-glass adhesive such as polyvinyl butyral, also known as PVB. A bracket 16, sometimes also known as a "channel mount" is slidably received over the button 14 and adjustably supports a rearview mirror mounting arm 18 and a rearview mirror 20 in cantilevered fashion such that they project into the vehicle passenger compartment for use by the vehicle driver. Although not forming any part of the present invention, a typical mounting arm 18 includes a swaged, one-piece tubular casing 22 enclosing a pair of plastic ball cups 24, 26 at each end thereof. The ball cups 24, 26 are forced outwardly by a compression spring 28 against the ends of the casing 22. A ball member 30 projects from the bracket 16 and is received in the ball cup 24. Similarly, a ball member 32 projects from the rearview mirror 20 and is received in the ball cup 26. It can be seen that the double ball joints of this structure provide a universal connection between the mirror 20 and the windshield 12 so that the driver may adjust it for his best rearview vision. It will further be understood that numerous variations for mounting the rearview mirror 20 to the bracket 16 are in common usage throughout the world, any one of which is easily adaptable for use with the bracket 16. For example, as is common in Europe, a single arm may project from the bracket 16 with a ball-and-socket connection on the end thereof directly with the rearview mirror 20.

Figure 2:
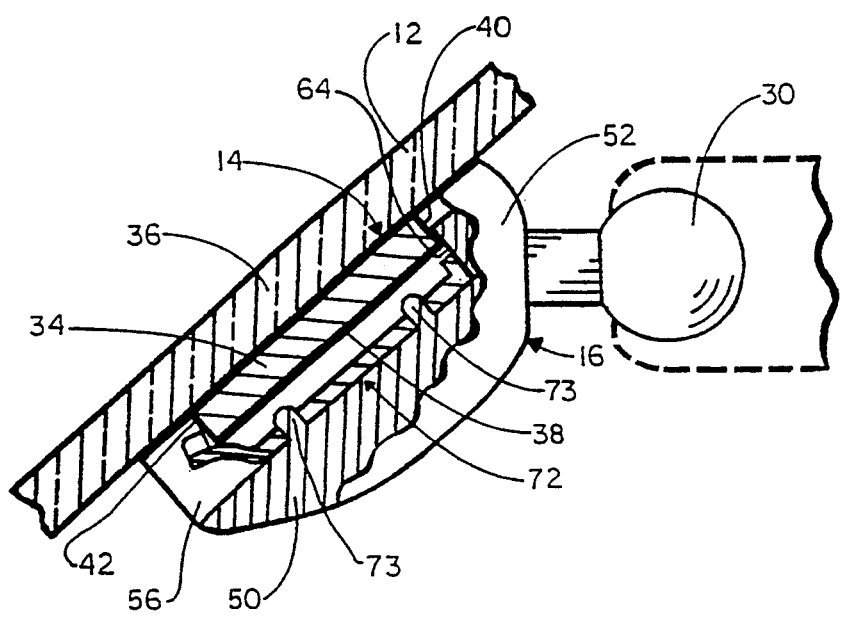
FIG. 2 is an enlarged side elevation, partly in section, of the mounting bracket of FIG. 1.
Figure 3:
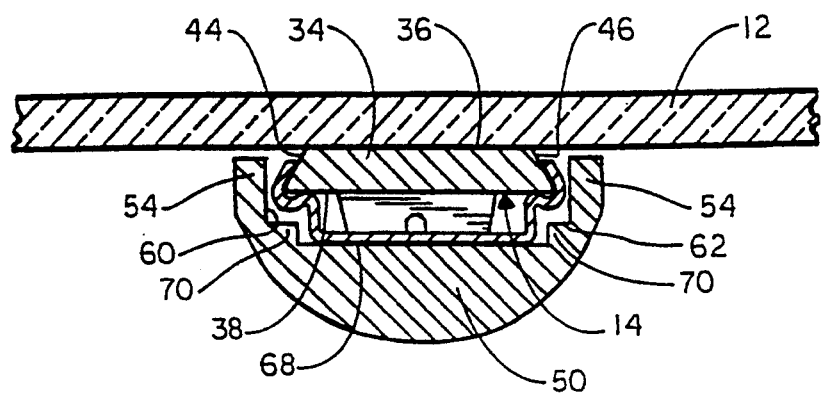
FIG. 3 is a cross-sectional view taken along line 3—3 of FIG. 2.
Figure 4:
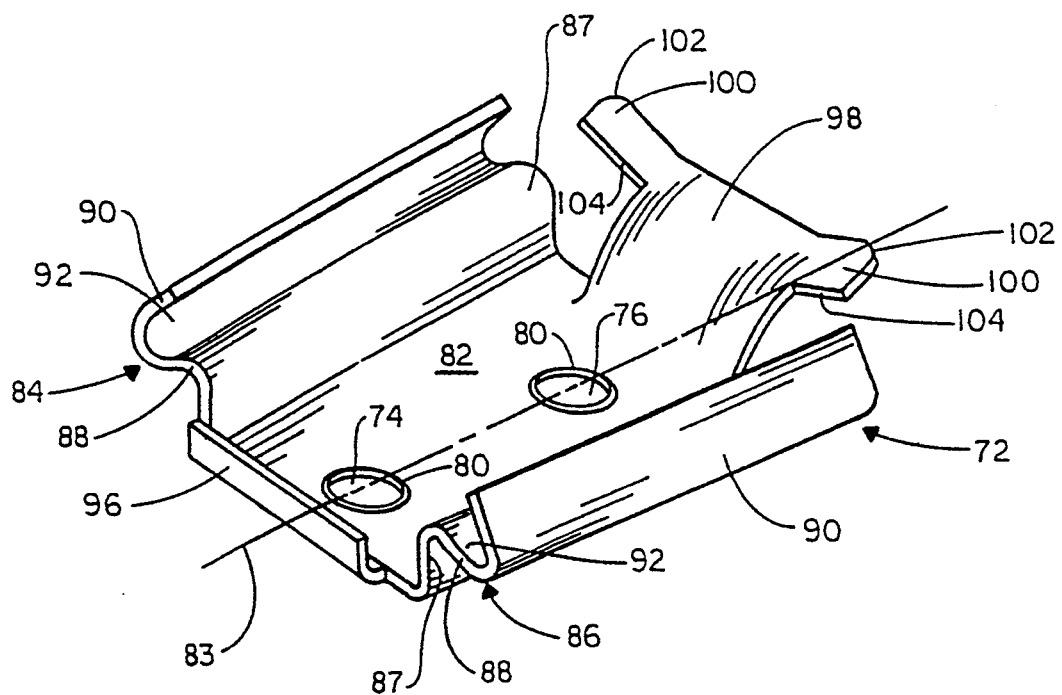
FIG. 4 is an isometric view of the spring clip used in the mirror mount of FIG. 1.

Referring now to FIGS. 2, 3 and 8, the button 14 is typically an elongated body 34 preferably formed from sintered stainless steel, although other metals, plastics, or other materials and other forming processes could also be used. The body 34 includes front and rear surfaces 36, 38, respectively, a top surface 40, a bottom surface 42, and opposing side surfaces 44, 46. Typically, the top surface is rounded or semicircular (see FIG. 8), and the side surfaces 44, 46 are inclined relative to a longitudinal axis 48 so as to appear convergent. Also, the side surfaces 44, 46 are beveled or tapered toward the windshield as shown more clearly in FIG. 3 so that the width of the rear surface 38 is greater than the width of the front surface 36. Each of the front and rear surfaces 36, 38 is substantially planar over its entire extent, the front surface 36 being adapted to be adhered by the conventionally-known metal-to-glass adhesive, mentioned above, to the inside surface of the glass windshield 12.

The bracket 16 comprises a one-piece body 50 from which the ball member 30 projects outwardly. Looking now at FIGS. 2, 3 and 8, the body 50 has a top end 52 which may be curved to roughly conform to the top surface 40 of the button 14 and has tapered sides 54 terminating at an open end 56. The body 50 also includes an interior recess 58 which is bounded by converging side surfaces 60, 62, a top surface 64, and a mounting surface 68. The side surfaces 60, 62 may include a shoulder 70. The top surface 64 of the body is preferably shaped and dimensioned to conform to the top surface 40 of the button so that it functions as a stop member when the bracket is mounted to the button. The top surface 64 may also comprise a projection thereon which serves as the stop member or, alternatively, a separate stop member may project upwardly from the mounting surface 68. However embodied, the bracket 16 has a stop member which is adapted to rest against the top surface 40 of the button when the bracket is mounted to the button. Preferably, the side surfaces 60, 62 are dimensioned and shaped to conform to, but be spaced from, the side surfaces 44, 46 and the top surface 40 of the button 14 to provide a gap therebetween so that the bracket may snap free of the button.

A spring clip 72 is fixed to the mounting surface 68 within the recess 58 by a conventional fastening means. For example, the spring clip 72 may be fastened to the body 50 by projections 73 extending from the mounting surface 68 and which are disposed through the aligned openings 74, 76. They can be press fit as illustrated in FIG. 2 or spun over to provide rivetlike connections. Alternatively, screws (not shown) may be disposed through aligned openings 74, 76 in the spring clip 72 and received in threaded holes (not shown) in the body. The openings 74, 76 can include a turned lip 80 to provide reinforcement.

The purpose of the spring clip 72 is to provide a snap-action interconnection between the bracket 16 and the button 14 and consequently provide a snap-action interconnection between the entire mirror assembly 10 and the windshield 12. Another purpose of the spring clip 72 is to provide for easy installation of the bracket 16 without special tools and provide a means so that the installer will know that the bracket is installed correctly.

Looking now at FIGS. 4 through 7, the spring clip 72 is formed from a single piece of spring steel, preferably of a thickness between 0.025 inches and 0.030 inches. The hardness of the steel is preferably within a range of 30 to 50 on the Rockwell C Scale.

The spring clip 72 includes a generally flat, centrally disposed base portion 82 in which the openings 74, 76 are disposed along a longitudinal axis 83 thereof. Projecting upwardly from opposing sides of the base portion 82 are a pair of flanges 84, 86 which are tapered relative to the longitudinal axis of the base portion in a converging fashion. Each flange 84, 86 comprises an upstanding wall 87 disposed, when unassembled, at about 85° from the plane of the base portion 82 which terminates in an outwardly directed portion 88 followed by an inwardly directed portion 90. The angle between the base portion 82 and the upstanding wall 87 is designed to be slightly acute to apply a preload to the clip walls before assembly to the button. When the clip 72 is on the button, the flanges 84, 86 are sprung outwardly so that the upstanding walls 87 are about 90° with respect to the base portion 82. The preload on the walls 87 provides a resilient, tight fit between the spring clip 72 and the button 14 to minimize vibration between the button and the bracket 16. Each outwardly directed portion 88 and inwardly directed portion 90 thus defines a groove 92. An upstanding flange 96 projects from a top portion of the clip 72. If not formed as part of the body 50, the stop member may be formed in the spring clip 72 by an extension of the upstanding flange 96.

Projecting upwardly and curving rearwardly from a rear portion of the base portion 82 is a resilient locking flange 98 having locking means disposed thereon. In the illustrated embodiment, the locking means comprises a pair of tabs 100 extending outwardly and upwardly from the distal end of the locking flange 98. A rearward edge 102 of each tab 100 is arcuate, and a frontward edge 104 of each tab is substantially straight.

Installation and operation of the rearview mirror assembly 10 is described as follows and best illustrated in FIGS. 2, 3, and 8. As heretofore described, the button 14 is permanently adhered to the windshield 12, and the spring clip 72 is permanently affixed to the bracket 16. It can be seen that the shoulders 70 are spaced from the outwardly directed portions 88 of each flange 84, 86 and thus allows the flanges 84, 86 to resiliently flex. To assemble the bracket 16 to the button 14, and consequently mount the rearview mirror assembly 10 on the windshield 12, the open end 56 of the bracket 16 is disposed above the top surface 40 of the button 14 and moved downwardly. During this motion, the tabs 100 contact the rear surface 38 of the button 14 and, nearly simultaneously, the side surfaces 44, 46 engage the grooves 92. The bracket 16 is then slid therealong until the top surface 40 of the button 14 engages the stop member 96, at which time the frontward edges 104 of the tabs 100 snap into firm engagement with the bottom wall 42 with a noticeable click which is both audible and tactile. Thus, the assembly person knows when the bracket 16 is fully seated on the button 14. Full seating is important in that it precludes backing off of the bracket from the button over a period of time due to vibration. Full seating is further important because vibration is minimized when the bracket 16 is fully seated on the button. In this position, the flanges 84 and 86 are the tightest on the side walls of the button 34. In this position, the spring clip 72 is locked in that the frontward edges 104 and the stop flange 96 inhibit further sliding movement along the longitudinal axis 83 in either direction. During the sliding movement of the spring clip 72 onto the button 14, the arcuate rearward edges 102 of the tabs facilitate smooth entry of the button into the grooves 92. Also, when the spring clip 72 is locked into position, the side surfaces 44, 46 tend to press outwardly against the inwardly directed portion 90 of the flanges 84, 86 whereby the spring clip and thus the bracket 16 is firmly interconnected with the button 14. Because of the corresponding convergent taper of the side surfaces 44, 46 and the grooves 92, the button 14 is also virtually wedged into the spring clip 72. The interconnection is sufficiently firm so that during normal use, the rearview mirror 20 can be freely adjusted by the driver via the mounting arm 18 to any desired position, and vibration of the mirror 20 during travel is minimized.

However, the resilient interconnection is such that if a predetermined force is directed against the bracket in any direction such as caused by the inflation of an air bag, it would be snapped off of the button 14 and dropped from its mounting. The spring clip 72 is so designed as well as the interacting tapers of the side walls 44, 46 and the grooves 92, respectively, so that an impact of approximately 45 pounds of force will disengage the spring clip 72 from the button 14.

FIG. 9 shows a modified form of the invention in which a slightly different button is used. Like numerals have been used to designate like parts. In FIG. 9, the button 14' has side walls 44' and 46' which extend at right angles to front surface 36'. The side walls terminate in gibs 45 which form rails which function the same as the tapered side walls 44 and 46 of the button 14. The clip 72' is of like construction as clip 72 except that the flanges 90' are bent inwardly at ends 93 to conform to the shape of the gibs 45. Otherwise, the shape of the clip 72' is identical to and functions the same as clip 72.

FIGS. 10-14 illustrate a further modified form of a mounting bracket 116 and a spring clip 172. The mounting bracket 116 comprises a one-piece body 150 from which a ball member 130 projects outwardly. The body 150 has a top end 152 which may be curved to roughly conform to the top surface 140 (FIGS. 13 and 14) of the button 114. The mounting bracket 116 includes an interior recess 158 bounded by sidewalls 154 which terminate at opposite ends in open ends 156 and 157 and a windshield facing edges 160. The interior recess 158 includes a plurality of ribbing 153 defining a mounting surface 155 for the spring clip 172. A pair of upstanding mounting posts 159 extend upwardly from the mounting surface 155 in the longitudinally central region of the body 150. All upwardly facing surfaces 155 of the ribbing 163 are generally coplanar.

A plurality of upstanding button support members 161 project upwardly from the mounting surfaces 155 and terminate at the upper ends in a flat surface 162, each of which is generally coplanar with the other and generally parallel to the mounting surface 155. Some of the upstanding button support members 161 are connected to the sidewalls 154 through web members 163. An edge of the flat surfaces 162 facing the open end 156 are bevelled as at 164 downwardly toward the mounting surfaces 155 to define bottom facing surfaces thereat.

Figure 10:
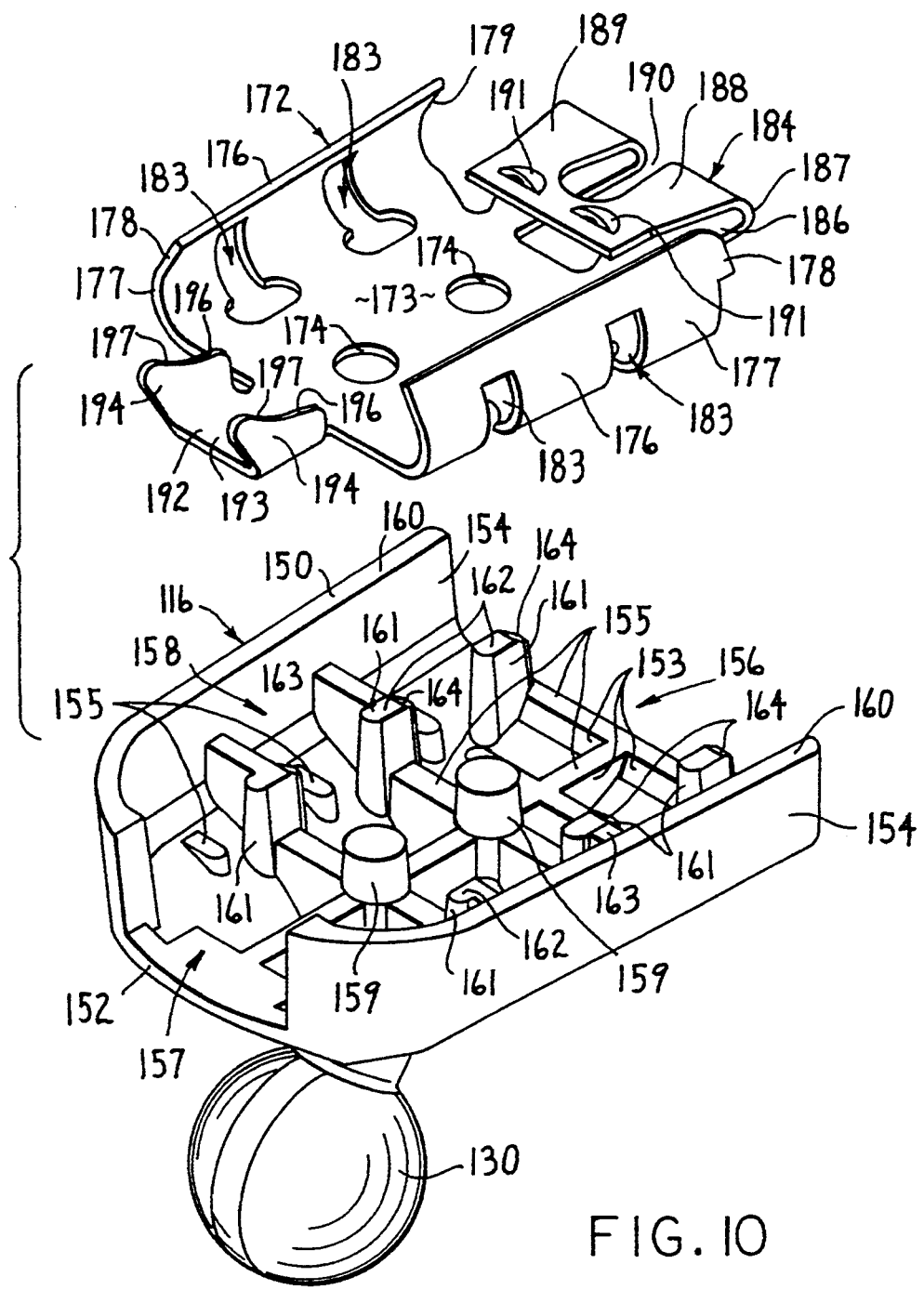
FIG. 10 is an exploded isometric view illustrating a modified form of the mounting bracket and the spring clip and which embodies the invention.
Figure 11:
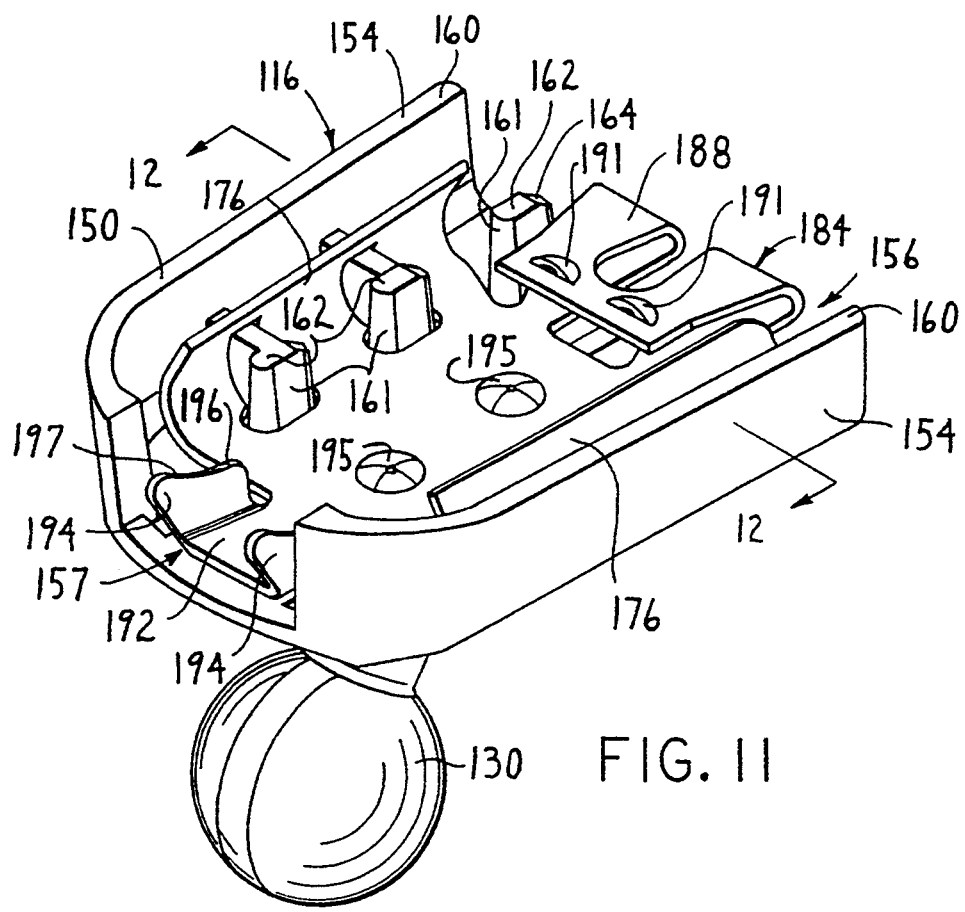
FIG. 11 is an isometric view of an assembled mounting bracket and spring clip illustrated in FIG. 10.
Figure 12:
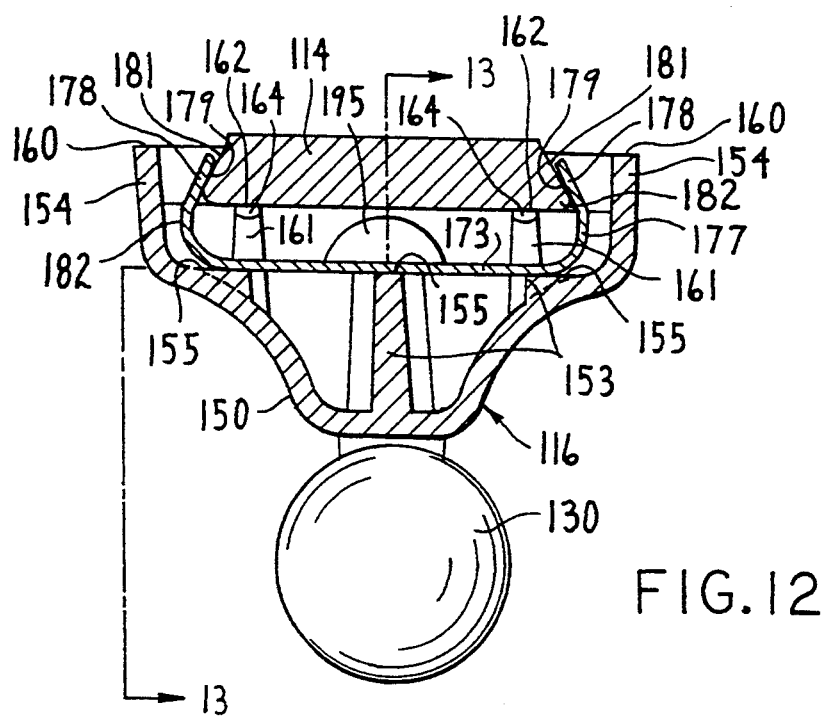
FIG. 12 is a sectional view taken along the line 12—12 of FIG. 11.
Figure 13A:
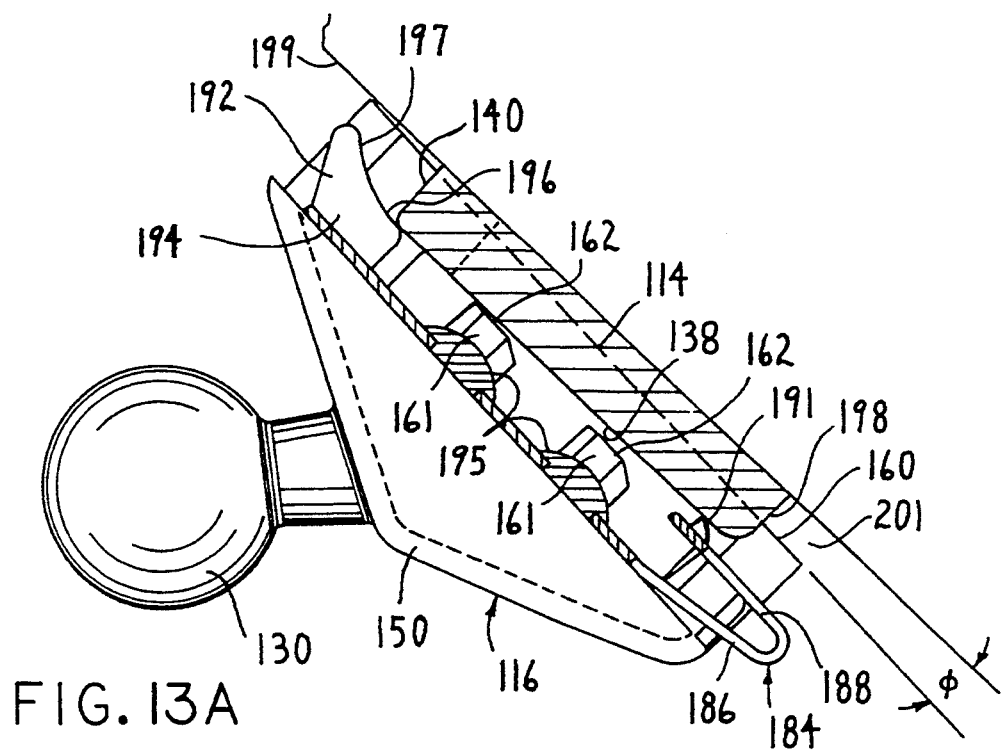
FIG. 13A is a sectional view in the same plane as FIG. 14, but showing the mounting bracket in a position relative to the button substantially spaced from and in the fully seated position of FIG. 14.
Figure 13B:
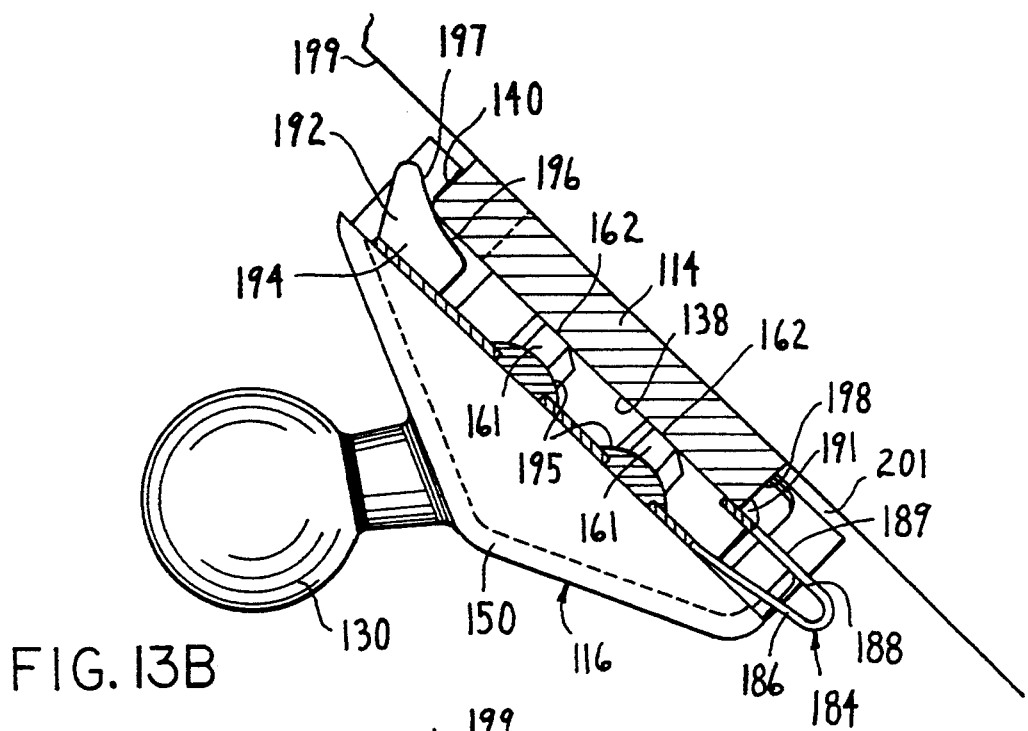
Figure 14:
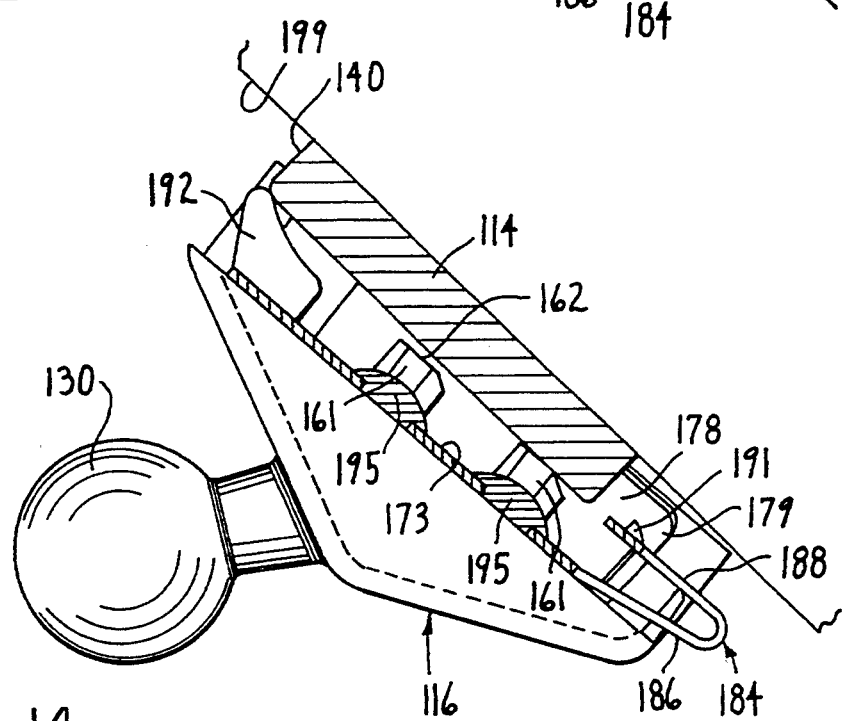
FIG. 14 is a sectional view similar to FIG. 13, but with the mounting bracket slid partially off from the button.

The spring clip 172 is constructed of the same material as has been described above. The spring clip includes a generally flat base portion 173 having a pair of openings 174 therein and which are adapted to receive the mounting posts 159 therein as shown in FIGS. 11, 13B and 14. A pair of elastically yieldable sidewalls 176 extend upwardly from the lateral edges of the base portion 173. In this particular embodiment, each sidewall has an upstanding portion 177 oriented generally perpendicularly to the plane of the base portion 173 as shown in FIG. 12. The upper edge of the sidewall portion 177 terminates in an inwardly angled segment 178, the inwardly facing surface 179 of which is adapted to engage the bevelled, outwardly facing, surface 181 of the button 114. In other words, each of the sidewalls 176 define a groove adapted to receive a side edge portion 182 of the button 114 as shown in FIG. 12. Further, each sidewall 176 has a plurality of openings 183 therein, the number of which corresponds to the number of upstanding button support members 161 on the body 150. Each of the openings is generally T-shaped as best illustrated in FIG. 10. The stem of the T is adapted to receive the web 163 whereas the cross portion of the T is adapted to receive the upstanding button support member 161 as shown in FIG. 11.

The spring clip 172 includes a resilient locking flange 184 extending longitudinally from one end of the base portion 173. More specifically, the locking flange 184 includes a first segment 186 contiguous with the base portion 173 and extends longitudinally from the aforesaid one end of the base portion and at an angle thereto that is in the range of 10° to 20° to the plane of the base portion 173. The distal end of the first segment 186 terminates in an upwardly projecting portion 187 that is, and in this particular embodiment, radiused. A second segment 188 of the locking flange 184 is contiguous with the upper end of the upwardly projecting portion 187 and extends from the upwardly projecting portion 187 in an overlapped relation with the first segment 186 to a location intermediate the sidewalls 176 of the spring clip 172. The upper surface 189 of the second segment 188 has a pair of upstanding tabs 191 thereon, which tabs 191 are formed from the material of the second segment 188 of the locking flange 184. In the assembled state of the spring clip to the body 150 as illustrated in FIG. 11 as well as in FIG. 13, the upper surface of the second segment 188 is initially oriented in a plane that is slightly inclined with respect to the base portion 173 so that the second segment 188 diverges away from the plane of the base portion 173. The purpose of this orientation will become apparent below.

If desired, the locking flange 184 can be provided with a central cutout portion 190 to render the locking flange 184 more easily yieldable to forces applied thereto.

A button rest construction 192 is provided at the opposite end of the spring clip 172 and includes a base part 193 contiguous with the base portion 173 and is generally coplanar therewith. The base part 193 has a pair of upstanding sidewall portions 194 contiguous therewith at the lateral side edges thereof. The upper edges of the sidewalls 194 terminate in first and second edge surface portions 196 and 197 extending generally inclined relative to the surfaces 162 on the upper end of each of the button support members 161 when the spring clip is in the assembled condition as illustrated in FIGS. 11 and 13. The first edge surface 196 also extends in a generally upwardly inclined relation to the plane of the base portion 173 at an angle generally in the range of 10° to 30°. A second edge surface 197 extends inclined further upwardly from the surface 196 and at an angle that is generally approximately in the range of 140° to 160° to the surface 196.

As the spring clip is lowered into the interior recess 158 of the body 150, the openings 174 in the spring clip 172 receive the upstanding posts 159 as stated above. The button rest 192 is received in the open end 157 and the locking flange 184 projects outwardly from the open end 156. The upstanding posts 159 will project through the openings 174 in the spring clip 172 so that they can be press fit or spun over to provide a rivet-like connection 195.

During assembly, as shown in FIG. 13, the body 150 of the mounting bracket 116 is first oriented adjacent the top end 140 of the button 114 and the sidewalls 176 of the spring clip 172 straddling the outwardly facing sides 181 of the button 114 and caused to be slid in a direction generally parallel to the windshield surface 197 to the position of FIG. 13. In this position, the mounting bracket 116 is not yet seated on the button. Further, the sidewalls 176 of the spring clip 172 have not yet fully gripped the outwardly facing sides 181 of the button 114. As a result, the spring force of the locking flange 184 is strong enough to prevent a relative flexing movement between the second segment 188 and the first segment 186. This will cause the mounting bracket 116 particularly the plane containing the edges 160 (see FIG. 10) of the sidewalls 154 to become angularly related at an angle $\phi$ of 3° to 5° to a plane of the inside facing surface 199 of the windshield as shown in FIG. 13. During the initial stages of this movement, the upstanding tabs 191 on the second segment 188 are sliding along the rear surface 138 of the button 114. During this movement, the surfaces 162 on the button support members 161 are spaced from the rear surface 138 of the button 114. The surfaces 164 assure the smooth transition of the body 150 onto the button 114. Continued movement of the mounting bracket 116 downwardly and to the right in FIG. 13 in a direction parallel to the windshield glass 199 will eventually bring the mounting bracket 116 to the position illustrated in FIG. 13. In the position of FIG. 13, it will be noted that the edges 160 of the sidewalls 154 of the mounting bracket 116 are still angularly related to the windshield surface 199. However, and since the sidewalls 176 of the spring clip 172 are now more fully engaged with the outwardly facing sides 181 of the button 114, a greater force attempting to urge the edges 160 into a parallel relation with the windshield surface 199 is applied by the sidewalls 176 of the spring clip 172. Yet, the second segment 188 of the locking flange 184 is flexed toward the first segment 186 a little but sufficient spring force remains in the locking flange to prevent a complete parallel relationship from being achieved between the edges 160 and the windshield surface until the moment that the mounting bracket moves to the position of FIG. 13. In the position of FIG. 13, it will be noted that the tabs 191 on the surface 189 of the second segment 188 of the locking flange 184 will spring away from the first segment 186 of the locking flange 184 to become abutted against the locking flange edge 198 on the bottom portion of the button 114. When the second segment 188 of the locking flange 184 makes this final movement, there will be generated a single audible click indicating that the mounting bracket is fully seated and securely retained on the button under ordinary conditions. The top end 140 of the button 114 will engage generally the juncture between the surfaces 196 and the surfaces 197 on the sidewalls of the button rest 192. Further, and because of the corresponding convergent taper of the outwardly facing side surfaces 181 of the button 114 and the inwardly inclined relation of the segments 178 of the sidewalls 176 of the spring clip 172, the button 114 is virtually wedged into the spring clip 172. At the very moment that the single audible click occurs, the edges 160 move suddenly into a parallel relationship with the windshield surface 199. This sudden movement of the body 150 of the mounting bracket will be felt by the installer as a sudden pulse to the fingers which will manually signal the installer that a full seat of the mounting bracket 116 on the button 114 has occurred even if noise from adjacent assembly operations prevented the single audible signal from being heard by the installer. The interconnection is sufficiently firm so that during normal use, the rearview mirror can be freely adjusted by the driver via the mounting arm to any desired position, and vibration of the mirror during travel is minimized. Further, the resilient interconnection is such that if a predetermined force is directed against the mounting bracket 116 in any direction, it would be snapped off the button 114 and dropped from its mounting as described above. When such force is applied to the mounting bracket 116, the mounting bracket 116 will be urged further downwardly and rightwardly of the button 114 as illustrated in FIG. 14. The top end 140 of the button 114 will slide onto the surfaces 197 of the button rest 192 to effect a virtual prying of the sidewalls 176 from their respective engagement with the outwardly facing sides 181 of the button 114.

When the mounting bracket 116 is forcibly impacted and removed from the button 114, the exposed edges of the button are all rounded as shown in FIGS. 12-14. The rounded edges on the button will prevent occupants of the vehicle from coming into contact with any sharp corners or sharp edges on the button.

Figure 15:
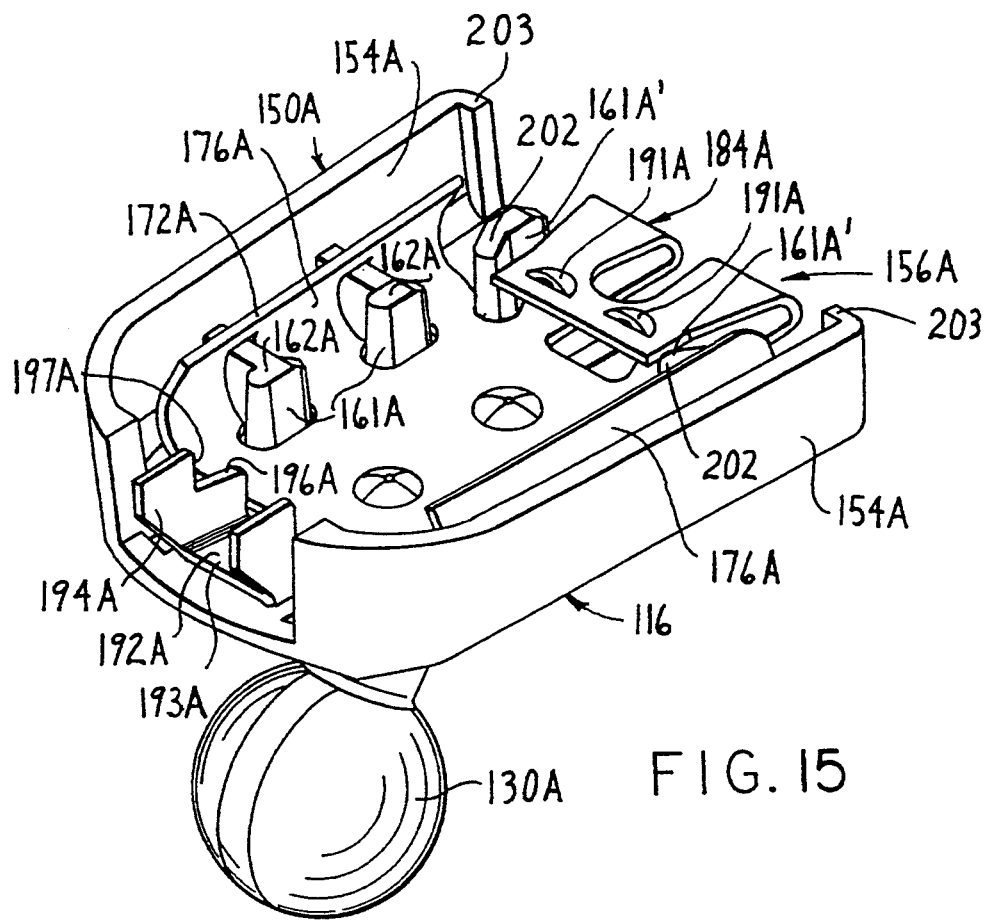
FIG. 15 is an assembled isometric view of a further modified form of the spring clip and the mounting bracket.

In situations where it is not desired for the mirror to be forcibly removed from the button 114 upon head impact (EEC Test), the spring clip 172A illustrated in FIG. 15 can be utilized. The construction of the spring clip 172A is virtually identical to the spring clip 172 and, therefore, the same reference numerals will be used in describing structure that is identical to the structure shown in FIGS. 10-14 but with the suffix "A" added to each reference numeral. It is believed unnecessary to describe the structure in FIGS. 15-16 that is identical to the structure in FIGS. 10-14 because such is presented above.

Figure 16:
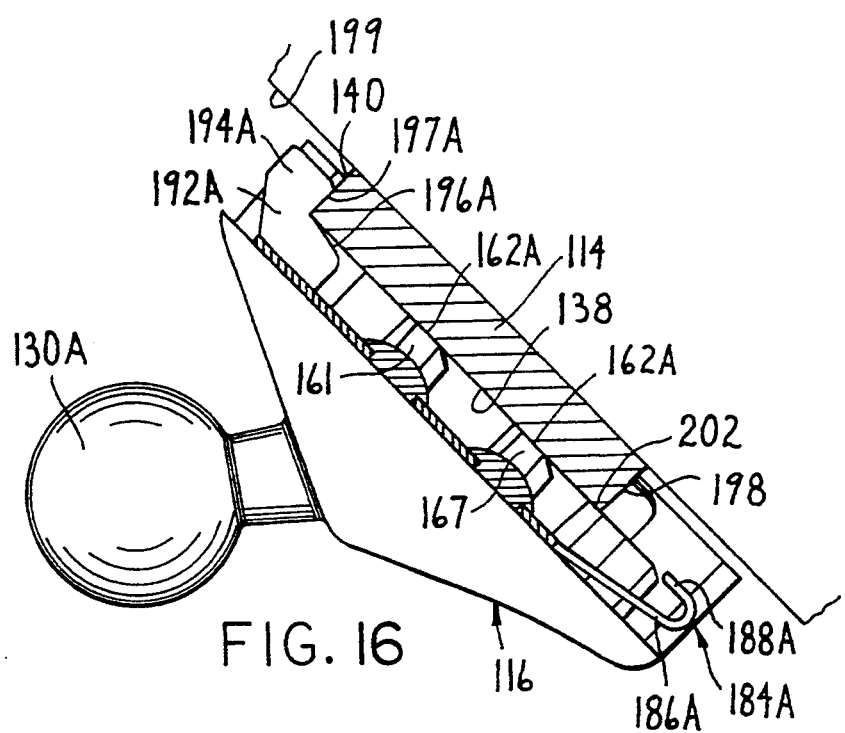
FIG. 16 is a sectional view similar to FIG. 13, but through the embodiment illustrated in FIG. 15.

Turning now to the important differences that exist between the embodiment of FIGS. 15-16 and the embodiment of FIGS. 10-14, the button rest 192A includes a pair of upstanding sidewalls 194A projecting upwardly from a base part 193A. In this particular embodiment, a pair of surfaces 196A and 197A are provided, the surface 196A being generally inclined relative to the surfaces 162A on the upper end of the button support members 161, just as is the surface 196 described above. The surface 197A is generally oriented through a sharp corner at an angle in the range of 100°–120° to the surface 196A and is adapted to flushly engage the top end 140 of the button 114 as illustrated in FIG. 16.

In the embodiment of FIGS. 10–14, when the mounting bracket 116 has been assembled to the position illustrated in FIG. 13, it will be noted that the bottom end of the mounting bracket, here the right end, is spaced from the windshield glass 199 by a gap 201. The spring force generated by the material of the locking flange 184 is not strong enough to prevent the mounting bracket 116 from rocking slightly in a counter-clockwise direction relative to the button 114 so as to reduce the size of the gap 201. In some instances, vibration of the mounting bracket 116 may possibly occur as the vehicle is driven. In order to cure this possibility, upstanding button support members 161A' which straddle the locking flange 184A are provided and include a surface component 202 which is oriented in the region between the tabs 191A and the button rest 192A so that the bottom portion of the button 114 adjacent the locking flange edge 198 is positively supported by the surface component 202 as shown in FIG. 16. The gripping action of the sidewalls 176A of the spring clip 172A will be sufficient to hold the surfaces 162A and 202 into tight engagement with the rear surface 138 of the button 114 to thereby prevent relative movement of the mounting bracket 116 relative to the button 114.

In addition, the sidewalls 154A (FIG. 15) at their ends adjacent the open end 156A are turned inwardly as at 203 to make the mounting bracket 116 less dangerous due to rounded corners being provided in the event that the mounting bracket 116 does indeed become removed from the button 114. This would be particularly true if the body 150A were employed in the embodiment of FIGS. 10–14.

The embodiments of the invention in which an exclusive property or privilege is claimed are defined as follows:

1. A breakaway bracket adapted for mounting a rearview mirror to a button having a rear surface secured to an inner surface of a motor vehicle windshield, said button having opposed side surfaces forming rails at an outer surface, a top surface, a bottom surface, a front surface extending between the top and bottom surfaces and facing away from said inner surface of said windshield, said front surface being generally parallel to said inner surface of the windshield, and a locking flange edge at a juncture of the front and bottom surfaces, said bracket comprising:

a body having a mounting surface;

a unitary spring clip securely mounted to the mounting surface, said spring clip having a base portion, longitudinally extending, opposed, resilient side flanges projecting upwardly from the base portion, each of the side flanges defining a groove adapted to slidably receive a corresponding one of the button side surface rails in tongue-and-groove fashion, said spring clip further having a resilient locking flange projecting upwardly from the base portion, a portion of said locking flange being adapted to slidingly engage the front surface of the button to cause said locking flange to elastically flex toward a plane of the base portion as the side flanges become fully engaged with the button side surface rails and without any audible clicking sounds caused by a sliding movement of said portion of said locking flange over the front surface, button rest means for engaging the top surface of the button to limit, as the side flanges become fully engaged with the button side surface rails, further movement of said body and said spring clip in a first direction relative to the button, said portion of said locking flange moving suddenly to a position firmly engaging the bottom surface of the button as said portion of said locking flange moves past the bottom surface of the button and at about the same time as said button rest means engages the top surface of the button, said sudden moving of said locking flange producing a clearly perceived indication that the bracket is fully mounted to the button, wherein said locking flange includes first means defining a tab having a surface firmly engaging the bottom surface of the button when the bracket is fully seated on the button and second means which strikes the front surface of the button to emit a single and pronounced audible click in response to said tab moving past the locking flange edge, said audible click being said clearly perceived indication that said bracket is fully seated on the button, whereby the bracket will be securely retained on the button under ordinary conditions when the button is slidably received in the spring clip but is adapted to be snapped off the button in a direction away from the windshield when a force of predetermined magnitude is applied thereto.

2. The breakaway bracket according to claim 1, wherein the bracket has a stop member which engages the top surface of the button when the bracket is mounted to the button.

3. The breakaway bracket according to claim 2, wherein the stop member is formed from one of a surface of the body and a projection extending upwardly from the base portion of the spring clip.

4. The breakaway bracket according to claim 1, wherein the front surface is entirely flat, and wherein the side surfaces are inclined relative to a longitudinal axis of the button so as to appear convergent, and the side flanges are also inclined at substantially the same angle as the side surfaces.

5. The breakaway bracket according to claim 1, wherein the resilient locking flange has a tab at a distal end thereof, the tab being adapted to seat behind the bottom surface with an audible sound when the bracket is slidably mounted on the button.

6. The breakaway bracket according to claim 5, wherein the tab projects laterally from the distal end of the resilient flange.

7. The breakaway bracket according to claim 6, wherein the tab has a straight forward edge and an arcuate rearward edge, and the forward edge engages the bottom surface when the bracket is mounted to the button.

8. The breakaway bracket according to claim 1, wherein the spring clip is made of spring steel.

9. The breakaway bracket according to claim 8, wherein the steel has a thickness in the range of 0.025 to 0.030 inches.

10. The breakaway bracket according to claim 8, wherein the steel has a hardness in the range of 30 to 50 on the Rockwell C scale.

11. The breakaway bracket according to claim 1, wherein the mirror mounting means comprises a ball extending from the body.

12. The breakaway bracket according to claim 1, wherein the resilient flange is adapted to generate an audible sound when the bracket is slidably mounted onto the button in fully seated condition.

13. The breakaway bracket according to claim 1, wherein the resilient flange is adapted to generate a tactile sonic vibration when the bracket is slid onto the button in a fully seated condition.

14. The breakaway bracket according to claim 1, wherein said tab, as the side flanges of said spring clip become fully engaged with the button side surface rails, also causes said body to adopt a first angular position relative to the windshield, said sudden movement of said tab to a position firmly engaging the bottom surface of the button simultaneously causing said body to suddenly move to a second and final angular, fully seated, position on the button to further enhance said clearly perceived indication.

15. A breakaway bracket adapted for mounting a rearview mirror to a button having a rear surface secured to an inner surface of a motor vehicle windshield, said button having opposed side surfaces forming rails at an outer surface, a top surface, a bottom surface, a front surface extending between the top and bottom surfaces and facing away from said inner surface of said windshield, said front surface being generally parallel to said inner surface of the windshield, and a locking flange edge at a juncture of the front and bottom surfaces, said bracket comprising:

a body having a mounting surface;
a unitary spring clip securely mounted on the mounting surface, said spring clip having a base portion, longitudinally extending, opposed, resilient side flanges projecting upwardly from the base portion, each of the side flanges defining a groove adapted to slidably receive a corresponding one of the button side surface rails in tongue-and-groove fashion, said spring clip further having a resilient locking flange projecting upwardly from the base portion, a portion of said locking flange being adapted to slidingly engage the front surface of the button to cause said locking flange to elastically flex toward a plane of the base portion as the side flanges become fully engaged with the button side surface rails and without any audible clicking sounds caused by a sliding movement of the locking flange over the front surface, button rest means for engaging the top surface of the button to limit, as the side flanges become fully engaged with the button side surface rails, further movement of said body and said spring clip in a first direction relative to the button, said resilient locking flange having a segment thereon which suddenly snaps against the front face of the button and at about the same time as said button rest means engages the top surface of the button to generate a single tactile indicia as said portion of said locking flange moves past the locking flange edge to cause said portion of said locking flange to become firmly engaged with the bottom surface of the button when the bracket is fully, seated on the button, whereby the bracket will be securely retained on the button under ordinary conditions when the button is slidably received in the spring clip but is adapted to be snapped off the button in a direction away from the windshield when a force of predetermined magnitude is applied thereto.

16. The breakaway bracket according to claim 15, wherein the front surface is entirely flat.

17. The breakaway bracket according to claim 15, wherein said tab, as the side flanges of said spring clip become fully engaged with the button side surface rails, causes said body to adopt a first angular position relative to the windshield, said sudden movement of said tab to a position firmly engaging the bottom surface of the button simultaneously causing said body to suddenly move to a second and final angular, fully seated, position on said button to further enhance said single tactile indicia.

18. The breakaway bracket according to claim 17, wherein said locking flange includes first means defining a tab having a surface firmly engaging the bottom surface of the button when the bracket is satisfactorily mounted on the button said segment striking the front surface of the button to emit a single and pronounced audible click in response to said tab moving past the locking flange edge, said audible click providing said single tactile indicia indicating that said bracket is fully seated on the button.

19. The breakaway bracket according to claim 15, wherein said locking flange includes first means defining a tab having a surface firmly engaging the bottom surface of the button when the bracket is satisfactorily mounted on the button said segment striking the front surface of the button to emit a single and pronounced audible click in response to said tab moving past the locking flange edge, said audible click providing said single audible click indicating that said bracket is fully seated on the button.

20. A breakaway bracket adapted for mounting a rearview mirror to a button having a rear surface secured to an inner surface of a motor vehicle windshield, said button having opposed side surfaces forming rails at an outer surface, a top surface, a bottom surface, a front surface extending between the top and bottom surfaces and facing away from said inner surface of said windshield, said front surface being generally parallel to said inner surface of the windshield, and a sharp locking flange edge at a juncture of the front and bottom surfaces, said bracket comprising:

a body having a mounting surface;
a spring clip securely mounted to the mounting surface, said spring clip having a base portion, longitudinally extending, opposed, resilient side flanges projecting upwardly from the base portion, each of the side flanges defining a groove adapted to slidably receive a corresponding one of the button side surface rails in tongue-and-groove fashion, and a resilient locking flange projecting upwardly from the base portion, a portion of said locking flange being adapted to slidingly engage the front surface of the button and elastically flex toward a plane of the base portion as the side flanges become fully engaged with the button side surface rails and without any audible clicking sounds caused by a sliding movement of the locking flange over the front surface, said resilient locking flange suddenly snapping against the front surface of the button to generate a single and pronounced audible clock as said portion of said locking flange moves past the locking flange edge to cause said portion of said locking flange to become firmly engaged with the bottom surface of the button when the bracket is fully seated on the button, whereby the bracket will be securely retained on the button under ordinary conditions when the button is slidably received in the spring clip but is adapted to be snapped off the button in a direction away from the windshield when a force of predetermined magnitude is applied thereto, wherein said spring clip is made of elastically yieldable spring material, wherein the resilient locking flange projecting upwardly from the base portion includes a first segment extending longitudinally from one end of the base portion, an upwardly projecting portion of the locking flange being oriented at a distal end of the first segment and including a second segment contiguous therewith and extending in an overlapping relation with the first segment but spaced from the first segment, the second segment, as the side flanges become fully engaged with the side surface rails, being elastically yieldably movable toward the plane of the base portion and the first segment about an axis defined generally by the upwardly projecting portion and against a spring force generated by the elastically yielding spring material, and wherein the portion of the locking flange adapted to firmly engage the bottom surface of the button includes at least one upwardly projecting tab on said second segment on a side thereof remote from the first segment, a surface on the tab firmly engaging the bottom surface of the button when the bracket is fully seated on the button.

21. A breakaway bracket according to claim 20, wherein the front surface is entirely flat.

22. The breakaway bracket according to claim 20, wherein the resilient locking flange extends longitudinally from a first end of the base portion, wherein means defining a button rest is provided and which extends longitudinally from a second end of the base portion opposite the first end, the button rest including means defining an upstanding surface oriented in a plane that is generally perpendicular to the longitudinal direction of the side flanges and against which an edge of the button is adapted to fixedly rest.

23. The breakaway bracket according to claim 20, wherein the resilient locking flange extends longitudinally from a first end of the base portion, wherein means defining a button rest is provided and which extends longitudinally from a second end of the base portion opposite the first end, the button rest including means defining a first surface extending generally inclined to a plane containing the base portion, and a second, upwardly inclined, surface oriented in a plane generally defining an obtuse angle with said first surface, the button being adapted to rest normally on at least one of the first and second surfaces, but slidingly engaging the second surface when the body is impacted by an external force.

24. The breakaway bracket according to claim 23, wherein an upper surface of the second segment is generally inclined with respect to the base portion.

25. The breakaway bracket according to claim 24, wherein the body includes at least one upstanding button support member along each of the lateral sides of the body and extending upwardly beyond the mounting surface, and wherein the side flanges each include means defining an opening for receiving the respective button support member therein, and wherein an upper end of the button support members terminates in a button support surface generally parallel to the base portion.

26. The breakaway bracket according to claim 25, wherein an edge of the button support surface facing the locking flange is bevelled toward the mounting surface.

27. The breakaway bracket according to claim 25, wherein a plurality of upstanding button support members are provided along each lateral side of the body, at least a pair of the button support members straddling the locking flange.

28. The breakaway bracket according to claim 27, wherein the pair of button support members straddling the locking flange each include a surface segment that extends into a region between the button rest and the portion of the locking flange adapted to firmly engage the bottom surface of the button.

29. The breakaway bracket according to claim 20, wherein said portion of said locking flange, as the side flanges of said spring clip become fully engaged with the button side surface rails, causes said body to adopt a first angular position relative to the windshield, said sudden movement of said locking flange to a position firmly engaging the bottom surface of the button simultaneously causing said body to suddenly move to a second and final angular, fully seated, position on the button to further enhance the significance of the single audible click.

30. A breakaway bracket adapted for mounting a rearview mirror to a button having a rear surface secured to an inner surface of a motor vehicle windshield, said button having opposed side surfaces forming rails at an outer surface, a top surface, a bottom surface, a front surface extending between the top and bottom surfaces and facing away from said inner surface of said windshield, and a locking flange edge at a juncture of the front and bottom surfaces, said bracket comprising:

a body member having a base portion and resilient means for gripping and releasably securing said body member to said button, said resilient means including longitudinally extending, opposed, resilient side flanges projecting upwardly from the base portion, each of the side flanges defining a groove adapted to slidably receive a corresponding one of the button side surface rails in tongue-and-groove fashion, a locking flange at one end of said body member projecting upwardly from said base portion, said locking flange, caused by said resilient means engaging the button side surfaces during a movement of said body member in a first direction generally parallel to the button side surfaces when assembling said body member to the button, slidingly engaging the front surface of the button;

button rest means at another end of said body member projecting upwardly from said base portion for engaging the top surface of the button to limit, as the resilient side flanges become fully engaged with the button side surface rails, further movement of said body member in said first direction relative to the button, said resilient means being interposed between said locking flange and said button rest means, said locking flange moving suddenly toward the inner surface of the windshield under an urging by said resilient means at about the same time as said button rest means engages the top surface of the button and said locking flange moves past the locking flange edge causing all of said body member to be forcibly drawn toward the inner surface of the windshield by said resilient means to orient said locking flange in a position firmly adjacent the bottom surface of the button and said button rest means firmly adjacent the top surface of the button and only when the bracket is fully mounted to the button and thereby providing a clearly perceived indication that said bracket has become fully mounted to the button, whereby the bracket will be prevented by said locking flange from moving in a second direction opposite to said first direction so as to be securely retained on the button under ordinary conditions when the bottom surface of the button is engaged by the locking flange and said resilient side flanges of said resilient means straddle the button but is adapted to be snapped off the button in a direction away from the windshield when a force of predetermined magnitude is applied thereto.

31. The breakaway bracket according to claim 30, wherein said body member and said resilient means are separate parts.

32. The breakaway bracket according to claim 30, wherein said body member includes mounting means for facilitating a securement of said rearview mirror thereto.

33. The breakaway bracket according to claim 30, wherein said locking flange is elastically yieldably movable toward said base portion, said elastically yieldable locking flange slidingly engaging the front surface of the button and elastically flexing toward a plane of the base portion as the side flanges become fully engaged with the button side surface rails and eventually, suddenly, snapping over the locking flange edge of the button.

34. The breakaway bracket according to claim 33, wherein said locking flange includes first means defining a tab having a surface firmly engaging the bottom surface of the button when the bracket is satisfactorily mounted on the button and second means which strikes the front surface of the button to emit a single and pronounced audible click in response to said locking flange snapping over the locking flange edge, said audible click being said clearly perceived indication that said bracket is fully seated on the button.

35. The breakaway bracket according to claim 34, wherein said second means is a flat surface that becomes oriented generally parallel to and engages the front surface of the button when said bracket is fully seated on said button.

36. The breakaway bracket according to claim 30, wherein said front surface of said button is entirely smooth and unobstructed and said locking flange edge is a sharp edge.

37. The breakaway bracket according to claim 30, wherein said locking flange has means thereon slidingly engaging the front surface of the button, as the side flanges of said spring clip become fully engaged with the button side surface rails, for causing said body member to adapt a first angular position relative to the windshield, said sudden movement of the locking flange and said means thereon to a position firmly engaging the bottom surface of the button simultaneously causing said body member to suddenly move to a second and final angular, fully seated, position on the button to further enhance the significance of the clearly perceived indication.

38. A breakaway bracket adapted for mounting a rearview mirror to a button having a rear surface secured to an inner surface of a motor vehicle windshield, said button having opposed side surfaces forming rails at an outer surface, a top surface, a bottom surface, a front surface extending between the top and bottom surfaces and facing away from said inner surface of said windshield, said front surface being generally parallel to said inner surface of the windshield, and a locking flange edge at a juncture of the front and bottom surfaces, said bracket comprising:

a body having a mounting surface;

a unitary spring clip securely mounted to the mounting surface, said spring clip having a base portion, longitudinally extending, opposed, resilient side flanges projecting upwardly from the base portion, each of the side flanges defining a groove adapted to slidably receive a corresponding one of the button side surface rails in tongue-and-groove fashion, said spring clip further having a resilient locking flange projecting upwardly from the base portion, a portion of said locking flange being adapted to slidingly engage the front surface of the button to cause said locking flange to elastically flex toward a plane of the base portion as the side flanges become fully engaged with the button side surface rails and without any audible clicking sounds caused by a sliding movement of said portion of said locking flange over the front surface, button rest means for engaging the top surface of the button to limit, as the side flanges become fully engaged with the button side surface rails, further movement of said body and said spring clip in a first direction relative to the button, said resilient locking flange having a segment thereon which suddenly snaps against the front face of the button at about the same time as said button rest means engages the top surface of the button to generate a single and pronounced audible click as said portion of said locking flange moves past the locking flange edge to cause said portion of said locking flange to become firmly engaged with the bottom surface of the button and thereby prevent a movement of said body and said spring in a second direction opposite to said first direction and only when the bracket is fully seated on the button, whereby the bracket will be securely retained on the button under ordinary conditions when the button is slidably received in the spring clip but is adapted to be snapped off the button in a direction away from the windshield when a force of predetermined magnitude is applied thereto.

39. The breakaway bracket according to claim 38, wherein the resilient locking flange extends longitudinally from a first end of the base portion, wherein said button rest means extends longitudinally from a second end of the base portion opposite the first end, said button rest means including means defining an upstanding surface oriented in a plane that is generally perpendicular to the longitudinal direction of the side flanges and against which the top surface of the button is adapted to fixedly rest.

40. The breakaway bracket according to claim 38, wherein the resilient locking flange extends longitudinally from a first end of the base portion, wherein said button rest means extends longitudinally from a second end of the base portion opposite the first end, said button rest means including means defining a first surface extending generally inclined to a plane containing the base portion, and a second, upwardly inclined, surface oriented in a plane generally defining an obtuse angle with said first surface, the button being adapted to rest normally on at least one of the first and second surfaces, but slidingly engaging the second surface when the body is impacted by an external force.

* * * * *

UNITED STATES PATENT AND TRADEMARK OFFICE
CERTIFICATE OF CORRECTION

PATENT NO. : 5 377 948
DATED : January 3, 1995
INVENTOR(S) : Danny L. Suman, et al.

It is certified that error appears in the above-indentified patent and that said Letters Patent is hereby corrected as shown below:

On the title page, item [63], line 1; change "Continuation" to ---Continuation-in-part---.

Column 13, line 59; delete ",".

Column 14, line 60; change "clock" to ---click---.

Column 17, line 54; change "adapt" to ---adopt---.

Signed and Sealed this

Twenty-eight Day of March, 1995

Attest:

BRUCE LEHMAN

Attesting Officer

Commissioner of Patents and Trademarks